(12) United States Patent  
Yang et al.

(10) Patent No.: US 9,306,248 B2  
(45) Date of Patent: Apr. 5, 2016

(54) BATTERY PACK AND LIQUID LEAKAGE DETECTION METHOD THEREOF

(71) Applicant: Microvast Power Systems Co., Ltd., Huzhou, Zhejiang (CN)

(72) Inventors: Congming Yang, Zhejiang (CN); Zhiming Tong, Zhejiang (CN); Xiang Li, Zhejiang (CN); Hui Li, Zhejiang (CN)

(73) Assignee: Microvast Power Systems Co., Ltd., Huzhou, Zhejiang (CN)

( * ) Notice: Subject to any disclaimer, the term of this patent is extended or adjusted under 35 U.S.C. 154(b) by 614 days.

(21) Appl. No.: 13/742,372

(22) Filed: Jan. 16, 2013

(65) Prior Publication Data

US 2013/0181826 A1 Jul. 18, 2013

(30) Foreign Application Priority Data

Jan. 16, 2012 (CN) .......................... 2012 1 0012103  
Jun. 26, 2012 (CN) .......................... 2012 1 0214299

(51) Int. Cl.  
*H01M 10/48* (2006.01)  
*H01M 10/42* (2006.01)  
*H01M 2/10* (2006.01)

(52) U.S. Cl.  
CPC ........ *H01M 10/484* (2013.01); *H01M 10/4228* (2013.01); *H01M 10/482* (2013.01); *H01M 2/1077* (2013.01); *H01M 10/488* (2013.01)

(58) Field of Classification Search  
CPC .................... H01M 10/4228; H01M 10/484  
See application file for complete search history.

(56) References Cited

U.S. PATENT DOCUMENTS

| 5,824,883 A | 10/1998 | Park |
| 2006/0134511 A1 | 6/2006 | Ito |
| 2011/0250477 A1 | 10/2011 | Yoshida |
| 2011/0318626 A1 | 12/2011 | Bartenschlager |

FOREIGN PATENT DOCUMENTS

| CN | 1170970 A | 1/1998 |
| CN | 1794512 A | 6/2006 |
| CN | 201413858 Y | 2/2010 |
| CN | 201528016 U | 7/2010 |
| CN | 201646343 U | 11/2010 |
| CN | 102227831 A | 10/2011 |
| CN | 102301523 A | 12/2011 |
| JP | S5514624 A | 2/1980 |
| JP | 200780733 A | 3/2007 |

*Primary Examiner* — Maria J Laios  
*Assistant Examiner* — Robert S Carrico  
(74) *Attorney, Agent, or Firm* — Winston Hsu; Scott Margo

(57) ABSTRACT

A battery pack and a liquid leakage detection method thereof are provided. The battery pack comprises a plurality of battery cells, a isolated liquid and a battery box containing the isolated liquid. The battery cells are soaked in the isolated liquid. The battery box comprising a box body and a cover plate. The isolated liquid is a fire-retardant and insulating liquid that has a specific gravity smaller than an electrolyte and is insoluble in the electrolyte. A collection portion is disposed at the bottom of the battery box, and a detection component is disposed in the collection portion. The present disclosure encloses the leaked electrolyte in the fire-retardant isolated liquid and uses the detection component to detect a resistance value of the isolated liquid so as to improve the safety of the box body.

11 Claims, 2 Drawing Sheets

BATTERY PACK AND LIQUID LEAKAGE DETECTION METHOD THEREOF

FIELD OF THE INVENTION

The present disclosure relates to a battery pack, and further relates to a liquid leakage detection method of a battery pack.

BACKGROUND OF THE INVENTION

Currently, battery-driven electric vehicle and electric buses are gradually replacing conventional vehicle and buses. battery cells act as a main energy storage device in an electric vehicle. A battery box, as a device for containing the battery cells, is a key component of the electric vehicle, and has a direct influence on the performance of the battery cells and thus on the performance of the electric vehicle. As lithium-ion power batteries have advantages such as the excellent power output performance and a long service life, they have been widely applied in the electric vehicle The battery cells, as a main energy storage device in the electric vehicle, is generally consists of a plurality of batteries connected in series or in parallel. The batteries may be subject to liquid leakage after being used for a period of time due to defects or unreasonable installation and fixation structures of the batteries. The leaked electrolyte is a flammable organic material, and is easy to ignite due to sparks or electrostatic discharges when being exposed to the air. This will reduce the safety of the battery pack and endanger the vehicle.

The conventional practice is to detect the liquid leakage through gas detection. The detection principle is generally as follows: due to the battery box is a relatively hermetic space, some gases are often formed and released when the electrolyte is leaked from the battery pack, and these gases can be detected by a gas detector. If these gases are detected by the detector, it represents that an accident of leakage occurs to the battery pack. However, this detection method has some shortcomings: 1. the gas detector is relatively expensive, and cannot deliver a good detection effect when the concentration of the gases is relatively low; and 2. the gas detector cannot work effectively until the gases in the battery box reach a certain concentration and, at this time, a relatively large amount of the electrolyte has been leaked. Because the flammable electrolyte is exposed to the air, this make accidents of fires and combustion likely to occur.

SUMMARY OF THE INVENTION

An objective of the present disclosure is to provide a safer battery pack and a liquid leakage detection method of a battery pack.

To achieve the aforesaid objective, the present disclosure provides a battery pack, which comprises a plurality of battery cells, a isolated liquid and a battery box containing the isolated liquid. The battery cells are soaked in the isolated liquid. The battery box comprising a box body and a cover plate. Electrical connection components are disposed in the battery pack. The isolated liquid is a fire-retardant and insulating liquid that has a specific gravity smaller than an electrolyte and is insoluble in the electrolyte. The electrical connection components are soaked in the isolated liquid. The battery cells are placed upside down. A support frame and a collection portion are disposed at the bottom of the battery box. The support frame supports the battery cells overhead. At least one detection component is disposed in the collection portion. The detection component is one or more of a conductivity sensor, a PH value sensor, a fluorion selective electrode and a liquid-level refraction sensor.

Preferably, the isolated liquid is one or both of silicone oil and transformer oil.

Preferably, the collection portion is V-shaped or U-shaped, and a recess is formed at a V-shaped or U-shaped bottom of the collection portion.

To achieve the aforesaid objective, the present disclosure further provides a battery pack, which comprises battery cells, a isolated liquid and a battery box containing the isolated liquid. The battery cells are soaked in the isolated liquid. The battery box comprising a box body and a cover plate. Electrical connection components are disposed in the battery pack. The isolated liquid is a fire-retardant and insulating liquid that has a specific gravity smaller than an electrolyte and is insoluble in the electrolyte. A collection portion is disposed at the bottom of the battery box, and a detection component is disposed in the collection portion.

When electrolyte leakage occurs to any of the battery cells, the electrolyte sinks to the collection portion of the battery box because the electrolyte has a larger specific gravity than the isolated liquid, and the detection component detects the leaked electrolyte and sends a feedback signal.

"The battery cells are soaked in the isolated liquid" means that the battery cells are partially or completely soaked in the isolated liquid.

Preferably, the electrical connection components are soaked in the isolated liquid. The electrical connection components include a relay, a connection copper sheet, a current collector and/or other components for connecting the battery pack. The term "immersing" means that the electrical connection components are completely merged in the isolated liquid.

Preferably, the isolated liquid is one or both of silicone oil and transformer oil. The two materials are preferred because of more stable fire-retardant and insulating properties thereof as compared to other liquids.

Preferably, the battery cells are placed upside down, and a support frame is disposed at the bottom of the battery box to support the battery cells overhead. "Disposing a support frame at the bottom of the battery box to support the battery cells overhead" means supporting electrode tabs of the battery cells overhead within the battery box to prevent the electrode tabs from contacting with the bottom surface of the battery box and from being pressed down by the support frame. "Placing the battery cells upside down" means disposing the battery cells with the electrodes thereof facing downwards. In this way, less isolated liquid can be used to immerse the electrodes therein. The term "immersing" used herein refers to merging the electrodes in the isolated liquid completely.

"The battery cells are soaked in the isolated liquid" means that the battery cells are partially or completely soaked in the isolated liquid.

Preferably, a bottom surface of each of the battery cells is fixed to the cover plate so that the battery cells can be fixed more securely.

Preferably, the detection component is one or more of a conductivity sensor, a PH value sensor, a fluorion selective electrode and a liquid-level refraction sensor. Any sensor may be used so long as it can give a feedback upon contacting with the electrolyte.

Preferably, the collection portion is V-shaped or U-shaped or in other forms which make it convenient to collect liquids.

Preferably, a recess is formed at a V-shaped or U-shaped bottom of the collection portion. The V-shaped bottom formed with the recess or the U-shaped bottom formed with the recess can collect the leaked electrolyte more easily because the electrolyte falls and is converged into the recess under the action of the gravity.

Furthermore, some measures may also be taken at the collection portion so that the electrolyte can be converted into a signal that can be measured more easily (e.g., water may be stored to react with the electrolyte to generate an acid, or a color indicator may be added). More kinds of detectors may be used for detection.

The present disclosure further provides a liquid leakage detection method of a battery pack. The battery pack is the aforesaid battery pack. The liquid leakage detection method of a battery pack comprises the following steps of: immersing the battery cells and the electrical connection components in the isolated liquid, and collecting the electrolyte having a larger specific gravity than the isolated liquid by the collection portion; detecting a real-time resistance value of the isolated liquid by the detection component; and prompting a driver for maintenance and replacement when the electrolyte is collected by the collection portion and the detection component detects that the real-time resistance value is smaller than a preset threshold.

Preferably, the isolated liquid is one or both of silicone oil and transformer oil; the detection component is one or more of a conductivity sensor, a PH value sensor, a fluorion selective electrode and a liquid-level refraction sensor; and the collection portion is V-shaped or U-shaped.

Through the solutions of the present disclosure, the leaked electrolyte can be enclosed in the fire-retardant isolated liquid so that the electrolyte is prevented from contacting with the air and thus cannot be combusted even at a high temperature so as to avoid risks; detecting at the first time whether liquid leakage occurs to any of the battery cells in the battery box and sending an alert can improve the safety of the battery box; and immersing the electrical components into the isolated liquid can prevent the electrical components from contacting with the air to be aged or combusted.

DETAILED DESCRIPTION OF THE INVENTION

Hereinbelow, embodiments of the present disclosure will be described in detail with reference to the attached drawings.

Embodiment 1

Figure 1:
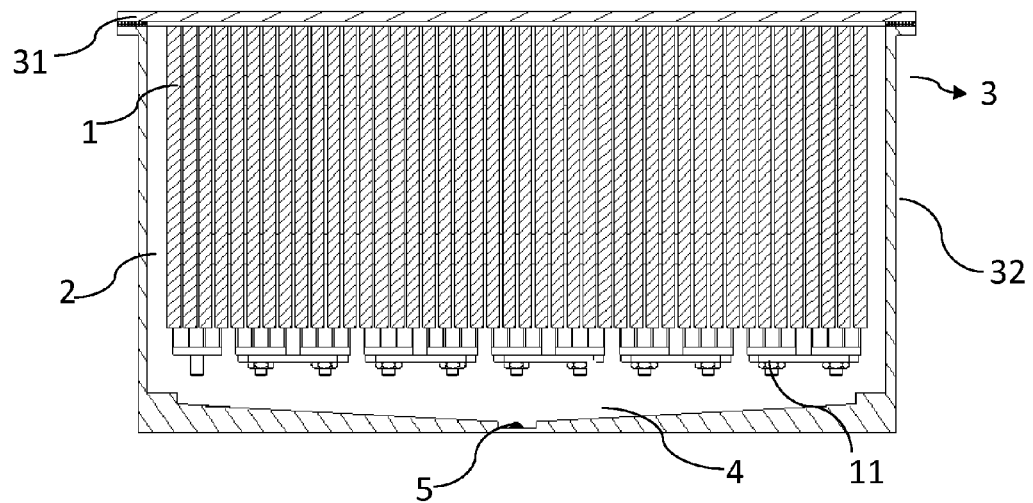
FIG. 1 is a schematic structural view of a V-shaped bottom of a battery box.
Figure 3:
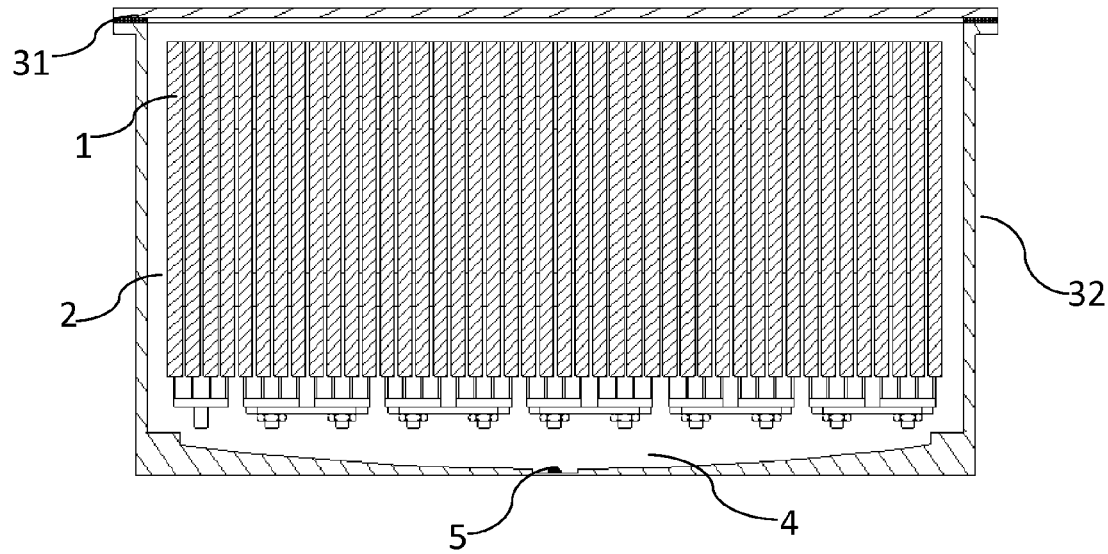
FIG. 3 is a schematic structural view of a U-shaped bottom of the battery box.

As shown in FIG. 1 and FIG. 3, a battery box 3 comprising a box body 32 and a cover plate 31, and a battery pack is soaked in a isolated liquid 2. The battery pack may be partially soaked in the isolated liquid 2 and may also be completely soaked in the isolated liquid 2; however, all of heating components and easy-to-leak components in the battery box must be merged in the isolated liquid 2. battery cells 1 are placed in the box body 32, and are connected in series or in parallel to form a battery module. The battery cells are placed upside down in the battery box 3 with a surface where electrodes of the battery cells 1 are located facing the bottom of the battery box 3; i.e., the battery cells 1 are disposed upside down. In this case, a bottom surface of each of the battery cells 1 is fixed to the cover plate 31. The battery cells 1 are partially or completely soaked in the isolated liquid 2, the battery cells 1 are placed upside down, and the "Placing the battery cells 1 upside down" means disposing the battery cells 1 with the electrodes thereof facing downwards. In this way, less isolated liquid 2 can be used to immerse the electrodes therein.

Figure 2:
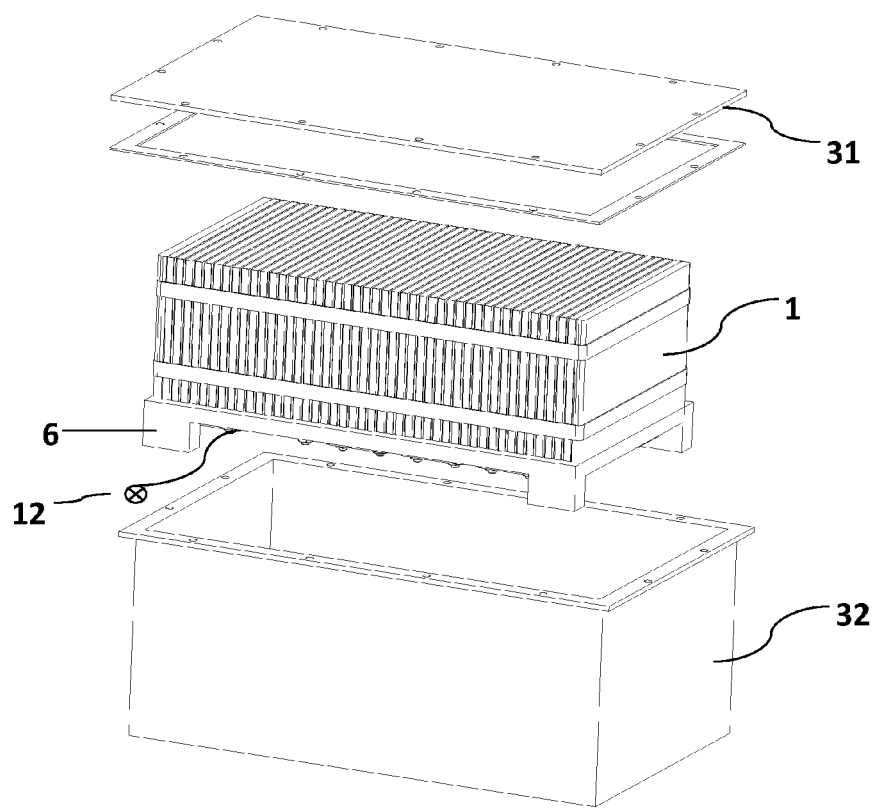
FIG. 2 is an exploded view of the battery box.

As shown in FIG. 2, a support frame 6 is disposed on the surface where the electrodes 11 of the battery pack are located (i.e., disposed at the bottom of the battery box 3) to support the whole battery pack and support the battery cells 1 overhead. A collection portion 4 at the bottom of the box body 32 is a V-shaped bottom of the box body that is in a funnel form. The electrolyte and silicone oil have different densities and are insoluble in each other, the electrolyte is a good electric conductor, and the isolated liquid 2 used in this embodiment is a poor electric conductor. Therefore, when liquid leakage occurs to a battery in the battery box 3, the battery cells will not be short-circuited due to the electrolyte. Electrical connection components 12 are disposed in the battery pack, the electrical connection components 12 are soaked in the isolated liquid 2. The electrical connection components 12 include a relay, a connection copper sheet, a current collector and/or other components for connecting the battery pack, and the term "immersing" means that the electrical connection components 12 are completely merged in the isolated liquid 2.

The isolated liquid 2 in this embodiment is preferably silicone oil, which is an insulating and fire-retardant liquid having a density of about 0.95 kg/L. The electrolyte has a density of about 1.5 kg/L. The silicone oil and the electrolyte are two kinds of liquids which are insoluble in each other or cannot react with each other. Therefore, if the electrolyte leaks from a battery in the battery box, the electrolyte will sink to the bottom of the silicone oil and will be thus isolated from the air to be protected from igniting due to sparks to cause risks. Of course, in other embodiments, it is also possible to use transformer oil, or use both the silicone oil and the transformer oil.

Meanwhile, an electrolyte collection device capable of collecting the electrolyte is designed at the bottom end of the battery box so that the liquid leaked from any of the batteries can be collected to a concentrating location at the bottom of the battery box. Meanwhile, the battery box is installed in a vehicle, and the silicone oil will flow in the box body when being exposed to continuous vibration, acceleration or deceleration, or subjected to other forces. Moreover, the electrolyte has a larger specific gravity than the silicone oil, so the leaked electrolyte will naturally fall under the influence of the gravity. Therefore, if liquid leakage occurs to a battery in the battery box of the vehicle, then most of the leaked electrolyte will be collected to the V-shaped bottom of the box body no matter where the liquid leakage occurs. Specifically, the leaked electrolyte can be collected to a recess formed at the V-shaped bottom.

A detection component 5 (e.g., a conductivity sensor, a fluorion selective electrode, a PH value sensor, a liquid-level refraction sensor or the like) capable of detecting different properties of two liquids is installed at the concentrating location. In this embodiment, the detection component 5 is preferably a conductivity sensor. For the normal battery box without liquid leakage, a resistance value detected by the conductivity sensor is relatively large because silicone oil is a poor electric conductor. When the electrolyte leaks from a battery in the battery box, the electrolyte is accumulated into the collection portion disposed at the bottom of the battery box and is detected by the detection component disposed in the collection portion. Specifically, the electrolyte is accumulated to a location in the electrolyte collection device where the conductivity sensor is installed. Because the electrolyte is a good electric conductor, the resistance value detected is decreased. When the resistance value is detected to be smaller than a threshold, an alarm signal is sent by the conductivity sensor to a vehicle control system and is displayed by an instrument panel. Thereby, the driver can be informed of whether there is a problem with the battery so as to carry out maintenance and replacement in time and reduce the possibility of occurrence of risks.

Embodiment 2

Figure 4:
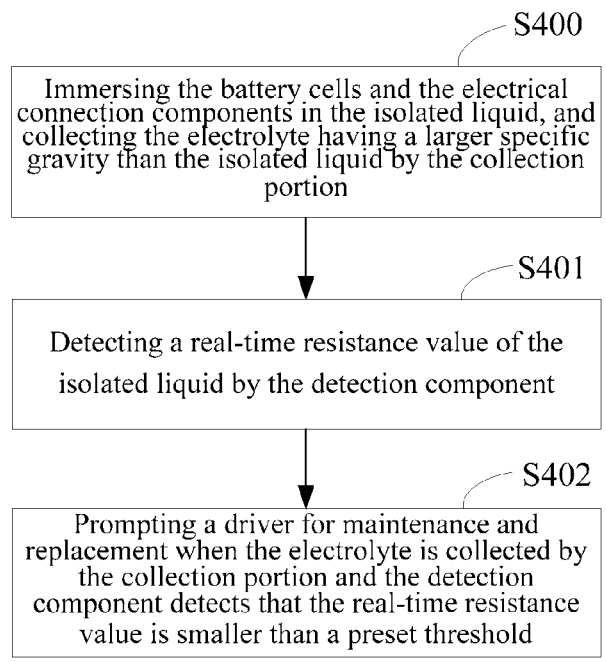
FIG. 4 is a flowchart diagram of a liquid leakage detection method of a battery pack according to an embodiment of the present disclosure.

As shown in FIG. 3 and FIG. 4, a battery box 3 comprising a box body 32 and a cover plate 31, and a battery pack is soaked in a isolated liquid. battery cells 1 are placed in the box body 32, and are connected in series or in parallel to form a battery module. The battery cells are placed upside down in the battery box 3 with a surface where electrodes of the battery cells 1 are located facing the bottom of the battery box 3.

As shown in FIG. 2, a support frame 6 is disposed on the surface, where the electrodes 11 of the battery pack are located, to support the whole battery pack. A collection portion 4 at the bottom of the box body 32 is a U-shaped bottom of the box body that is in a funnel form. "Disposing a support frame at the bottom of the battery box 3 to support the battery cells 1 overhead" means supporting electrode tabs of the battery cells 1 overhead within the battery box 3 to prevent the electrode tabs from contacting with the bottom surface of the battery box 3 and from being pressed down by the support frame. The electrolyte and silicone oil have different densities and are insoluble in each other, the electrolyte is a good electric conductor, and the isolated liquid 2 used in this embodiment is a poor electric conductor. Therefore, when liquid leakage occurs to a battery in the battery box 3, the battery cells will not be short-circuited due to the electrolyte.

The isolated liquid 2 in this embodiment is preferably silicone oil, which is an insulating and fire-retardant liquid having a density of about 0.95 kg/L. The electrolyte has a density of about 1.5 kg/L. The silicone oil and the electrolyte are two kinds of liquids which are insoluble in each other or cannot react with each other. Therefore, if the electrolyte leaks from a battery in the battery box, the electrolyte will sink to the bottom of the silicone oil and will be thus isolated from the air to be protected from igniting due to sparks to cause risks.

Meanwhile, an electrolyte collection device capable of collecting the electrolyte is designed at the bottom end of the battery box so that the liquid leaked from any of the batteries can be collected to a concentrating location at the bottom of the battery box. Meanwhile, the battery box is installed in a vehicle, and the silicone oil will flow in the box body when being exposed to continuous vibration, acceleration or deceleration, or subjected to other forces. Moreover, the electrolyte has a larger specific gravity than the silicone oil, so the leaked electrolyte will naturally fall under the influence of the gravity. Therefore, if liquid leakage occurs to a battery in the battery box of the vehicle, then most of the leaked electrolyte will be collected to the U-shaped bottom of the box body no matter where the liquid leakage occurs. Specifically, the leaked electrolyte can be collected to a recess formed at the U-shaped bottom.

A detection component 5 (e.g., a conductivity sensor, a fluorion selective electrode, a PH value sensor, a liquid-level refraction sensor or the like) capable of detecting different properties of two liquids is installed at the concentrating location. In this embodiment, the detection component 5 is preferably a conductivity sensor. For the normal battery box without liquid leakage, a resistance value detected by the conductivity sensor is relatively large because silicone oil is a poor electric conductor. When liquid leakage occurs to a battery in the battery box, the electrolyte is accumulated to a location in the electrolyte collection device where the conductivity sensor is installed. Because the electrolyte is a good electric conductor, the resistance value detected is decreased. When the resistance value is detected to be smaller than a threshold, an alarm signal is sent by the conductivity sensor to a vehicle control system and is displayed by an instrument panel. Thereby, the driver can be informed of whether there is a problem with the battery so as to carry out maintenance and replacement in time and reduce the possibility of occurrence of risks.

Embodiment 3

Referring to FIG. 4, the battery pack in this embodiment may be the battery pack described in the aforesaid embodiments. A liquid leakage detection method of a battery pack in this embodiment comprises, but is not limited to, the following steps of:

step S400: immersing the battery cells and the electrical connection components in the isolated liquid, and collecting the electrolyte having a larger specific gravity than the isolated liquid by the collection portion;

step S401: detecting a real-time resistance value of the isolated liquid by the detection component; and step S402: prompting a driver for maintenance and replacement when the electrolyte is collected by the collection portion and the detection component detects that the real-time resistance value is smaller than a preset threshold. Specifically in the step S402, the preset threshold may be set depending on actual needs; e.g., to take corresponding measures against the problem in time, the preset threshold may be set to be a small value to prevent occurrence of accidents.

As described above, the isolated liquid of this embodiment is one or both of silicone oil and transformer oil; the detection component of this embodiment is one or more of a conductivity sensor, a PH value sensor, a fluorion selective electrode and a liquid-level refraction sensor; and the collection portion of this embodiment is V-shaped or U-shaped. Furthermore, for the implementation of this embodiment, please also refer to the related description of the aforesaid embodiments. This can be readily understood by people skilled in the art and thus will not be further described herein.

What we claimed are:

1. A battery pack, comprising a plurality of battery cells, an isolated liquid and a battery box containing the isolated liquid, the battery cells being soaked in the isolated liquid, the battery box comprising a box body and a cover plate, and electrical connection components being disposed in the battery pack, wherein the isolated liquid is a fire-retardant and insulating liquid that has a specific gravity smaller than an electrolyte and is insoluble in the electrolyte, the electrical connection components are soaked in the isolated liquid, the battery cells are placed upside down, a support frame and a collection portion are disposed at the bottom of the battery box, the support frame supports the battery cells overhead, a detection component is disposed in the collection portion, and the detection component is one or more of a conductivity sensor, a PH value sensor, a fluorion selective electrode and a liquid-level refraction sensor.

2. The battery pack of claim 1, wherein the isolated liquid is one or both of silicone oil and transformer oil.

3. The battery pack of claim 1, wherein the collection portion is V-shaped or U-shaped, and a recess is formed at a V-shaped or U-shaped bottom of the collection portion.

4. A battery pack, comprising a plurality of battery cells, an isolated liquid and a battery box containing the isolated liquid, the battery cells being soaked in the isolated liquid, the battery box comprising a box body and a cover plate, and electrical connection components being disposed in the battery pack, wherein the isolated liquid is a fire-retardant and insulating liquid that has a specific gravity smaller than an electrolyte and is insoluble in the electrolyte, a collection portion is disposed at the bottom of the battery box, and a detection component is disposed in the collection portion.

5. The battery pack of claim 4, wherein the electrical connection components are soaked in the isolated liquid.

6. The battery pack of claim 4, wherein the isolated liquid is one or both of silicone oil and transformer oil.

7. The battery pack of claim 4, wherein the battery cells are placed upside down, and a support frame is disposed at the bottom of the battery box to support the battery cells overhead.

8. The battery pack of claim 4, wherein a bottom surface of each of the battery cells is fixed to the cover plate.

9. The battery pack of claim 4, wherein the detection component is one or more of a conductivity sensor, a PH value sensor, a fluorion selective electrode and a liquid-level refraction sensor.

10. The battery pack of claim 4, wherein the collection portion is V-shaped or U-shaped.

11. The battery pack of claim 10, wherein a recess is formed at a V-shaped or U-shaped bottom of the collection portion.

* * * * *